United States Patent [19]

Cave et al.

[11] 4,405,833

[45] Sep. 20, 1983

[54] TELEPHONE CALL PROGRESS TONE AND ANSWER IDENTIFICATION CIRCUIT

[75] Inventors: Ellis K. Cave; Neil Hazelwood, both of Garland, Tex.

[73] Assignee: TBS International, Inc., Richardson, Tex.

[21] Appl. No.: 274,691

[22] Filed: Jun. 17, 1981

[51] Int. Cl.³ .............................................. H04M 1/26
[52] U.S. Cl. ............................... 179/1 MN; 179/5 R; 179/6.02; 179/90 BD
[58] Field of Search ................... 179/1 MN, 5 R, 5 P, 179/90 BD, 6.02

[56] References Cited

U.S. PATENT DOCUMENTS

| | | | |
|---|---|---|---|
| 3,546,381 | 12/1970 | Foley et al. | |
| 3,761,632 | 9/1973 | Colman | 179/5 P |
| 3,927,259 | 12/1975 | Brown | 179/1 MN |
| 4,028,493 | 6/1977 | Brennemann et al. | 179/5 R X |
| 4,160,125 | 7/1979 | Bower et al. | 179/6.02 |
| 4,209,668 | 6/1980 | Weinberger | 179/90 BP X |
| 4,356,348 | 10/1982 | Smith | 179/1 MN |

FOREIGN PATENT DOCUMENTS

| | | | |
|---|---|---|---|
| 55-21670 | 2/1980 | Japan | 179/1 MN |
| 2005964 | 4/1979 | United Kingdom | 179/5 R |

*Primary Examiner*—G. Z. Rubinson
*Assistant Examiner*—Keith E. George
*Attorney, Agent, or Firm*—Edward D. Manzo

[57] ABSTRACT

Telephone call progress tones are identified by measuring the periods of their envelope cycles in the range of 20 to 200 Hertz which are due to the difference frequency of the signals used by phone company to form the call progress tones. The periods of the envelope cycles are classified, and a decision is made by a programmed microprocessor by comparing the data derived from the unknown signal to what is expected for known call progress calls of many telephone companies. In making such decision, the several period measurements are accumulated in bins, and the bin reaching the largest total is used to develop a representative period which is examined, if various other criteria are met, to identify the call. In this process, substantially regular envelope cycles are selected, and noise is rejected. An answer to the call is detected by this technique.

36 Claims, 13 Drawing Figures

TELEPHONE CALL PROGRESS TONE AND ANSWER IDENTIFICATION CIRCUIT

BACKGROUND OF THE INVENTION

The present invention relates to telephone equipment, particularly to an apparatus and method for automatically determining the status of a telephone call which has been placed by the apparatus.

Apparatus for automatically placing telephone calls to deliver prerecorded messages have, in the past, suffered from a disadvantage of not being able to recognize the signals that indicate call progress. Such automatic callers can be programmmed or arranged to deliver a recorded message to people on a list, given their phone numbers. The automatic caller could dial the respective telephone number for an individual, but would not know whether the call was ringing or answered, or whether the line was busy, out of service, etc.

One possibility is to use a phone handset hangup click detector which responds to the noise or signal which is generated when a telephone party hangs up the telephone. The same noise occurs when a called party answers the telephone. Circuits have been devised for detecting such noise, and a hang-up detector cooperating with a timer is one combination which can be used to learn some information about call progress. Basically, the timer would be set for some arbitrary time, such as 30 seconds. If there were no answer click, as detected by the hang-up detector, within the 30 second period, then the automatic telephone caller would assume that the call could not be completed and release the telephone line. The primary disadvantage of such a system is that it does not know whether the called telephone number resulted in a ringing signal, a busy signal, or a different signal. In other words, it does not identify call progress tones.

Accordingly, prior to the present invention there has been a need for a call progress tone detection circuit which would be capable of ascertaining the progress of each phone call which had been placed by the automated equipment. It is therefore one object of the present invention to provide a method and apparatus for achieving this purpose.

One complication in achieving this goal is the lack of an industry standard on the precise characteristics of the tones which connote various states. There is variance in call progress tones among American Telephone and telegraph telephones (the "Bell System"), the General Telephone and Equipment telephones, and other, independent telephone companies. Because an automatic caller places calls throughout the United States, a call progress tone detection circuit which is designed for use with such an automatic caller must be capable of recognizing any call progress tones, regardless of the telephone system which generates those tones. It is therefore a further object of the present invention to provide such a call progress tone detection circuit.

Still another object of the present invention is to provide a call progress tone detection circuit which is not unduly complicated, uses little space on a printed circuit board, and uses little hardware. In other words, a further object of the present invention is to provide a call progress tone detection circuit which is accurate, inexpensive, and compact.

SUMMARY OF THE INVENTION

According to various aspects of the present invention, a call progress tone detection circuit is provided which makes use of unique properties of call progress tones. These tones are usually formed by the mixing of two sinusoidal signals of different frequencies. For example, a busy tone may be formed from two signals with frequencies $F_1$ and $F_2$. A ringing tone might comprise a different combination, such as $F_1$ and $F_3$, and a third call progress tone may comprise still a third combination, such as $F_2$ and $F_3$. As is well-known, when signals of differing frequencies are mixed, the resultant signal has various components, one of which is related to the sum of the frequencies and another is related to the difference between the two frequencies. If this difference frequency is of a suitably low frequency, i.e., below 200 Hz, it has the effect of an amplitude modulation at that difference frequency. This is what gives the dial tone, busy and ringing tones their characteristic "purr" or "buzz". The frequency of this amplitude modulation is relatively unique for each type of call progress signal. By detecting this modulation envelope and examining its frequency as well as other timing parameters of the call progress signals, the type of signal can be determined.

The envelope of a call progress tone is usually a periodic low frequency sine wave component whose frequency is between 20 and 200 Hz and often between 30 and 150 Hz. The envelope frequency is related to the difference between the frequency of the two basic tones comprising the signal.

A call progress tone detection circuit according to certain aspects of the present invention extracts the low frequency envelope cycles (generally in the range of 20–200 Hertz) of the unknown signal and examines their periods. These period measurements are accumulated and then evaluated. If the envelope periods are not reasonably constant over a standard measurement interval, then the call progress tone detection circuit can conclude that the unknown signal is voice. However, if the envelope period is regular, then the call progress tone detection circuit according to the preferred embodiment of the present invention will compare the detected envelope period and other timing parameters of the signal to known periods and corresponding parameters for signals used by the various telephone systems in current use in the United States. If there is a match between the detected parameters, then the call progress tone detection circuit identifies the call progress tone for further use by the automatic telephone caller. For example, if the call progress tone detection circuit ascertains that a dialed telephone number is returning a BUSY signal, then the associated automatic caller may decide to release the line which has been dialed, store the telephone number in a scratch pad memory or the like, and attempt to establish communication with that subscriber at a later time. The circuit according to another aspect of the invention determines whether a RINGING call has been answered.

BRIEF DESCRIPTION OF THE DRAWINGS

In describing a preferred embodiment of the present invention, reference is made to the appended drawings in which.

DETAILED DESCRIPTION OF A PREFERRED EMBODIMENT

Figure 1:
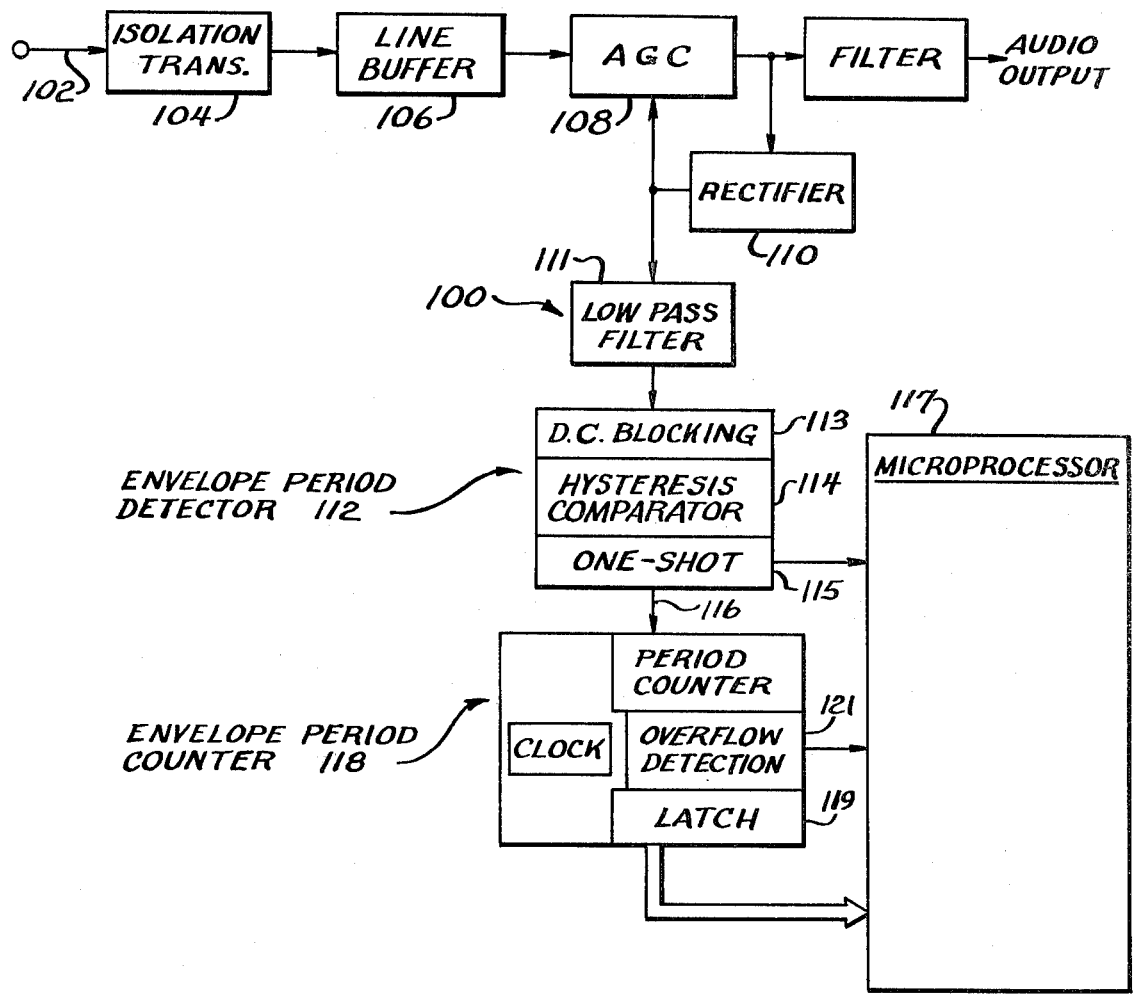
FIG. 1 is a simplified block diagram of a preferred embodiment of the present invention in an automatic telephone caller environment.

FIG. 1 is a block diagram of a call progress tone detection circuit 100 according to the preferred embodiment of the present invention in an automatic caller apparatus. The call is connected to the telephone control office 102 by an isolation transformer 104 and line buffer 106. The incoming signals are passed through an automatic gain control circuit 108 which includes a full-wave rectifier 110. The specification of U.S. Pat. No. 4,333,056 entitled "Automatic Gain Control Circuit with Non-Negative Exponential Release," of Ellis K. Cave, one of the inventors of the present invention, filed Apr. 7, 1980 and issued June 1, 1982, shows circuitry including a full-wave recitifier which can provide rectified incoming signals as outputted by rectifier 110 of FIG. 1. It will be understood, of course, that the automatic gain control invention described therein is not required for practicing the present invention. It will be appreciated also that rectification other than full-wave, i.e., half-wave, for example, may be used within the scope of the present invention, although half-wave rectificaion does not perform as well.

Rectified signals from rectifier 110 are applied to a low pass filter 111 which outputs a signal representing approximately the average power of the incoming signal. As mentioned supra, if the incoming signal is indeed a call progress tone, then it is comprised of two components which have been combined to form a resultant signal with periodic amplitude modulation. The output of low pass filter 111 is illustrated as V111 of FIG. 3. It is important to realize that the filter 111 passes DC signals, so the output V111 comprises a signal approximating the average power of any signal which is received by the automatic calling equipment.

The output of filter 111 is applied to an envelope period detector 112. To extract the superimposed envelope period, a DC blocking circuit 113 is employed to remove the DC or low frequency shift associated with signal presence. This places the smaller periodic envelope fluctuations on a constant reference, as shown in V121. These fluctuations are the higher frequency (above 10 Hz) amplitude modulations that allow signal differentiation. A hysteresis comparator 114 converts the signals to a digital level signal containing the period information as shown in V122. A one-shot 115 removes one edge of information, causing a pulse to be generated on a positive edge of the period, thus maintaining full period information as shown in V124. This signal is called the period interrupt and occurs on the output 116 of envelope period detector 112.

The period of the envelope signal is determined next. One manner is to apply the period signal to a microprocessor 117 which times the period between pulses of the signal. However, in the preferred embodiment of the present invention, the work load on processor 117 is minimized so that its capabilities will be available for other computing functions which may be necessary or convenient in the automatic calling equipment.

Accordingly, an envelope period counter 118 is provided in the preferred embodiment of the present invention for measuring the time elapsed between period interrupt pulses and presenting this time to microprocessor 117 via a latch 119 representing the period of each signal envelope excursion. Overflow circuitry 120 develops an overflow signal V153 and passes it to microprocessor 117 whenever the period counter overflows indicating an elapsed time for a period beyond the period counter's capability. This allows the processor 117 to keep track of time during long envelope periods by counting overflow pulses. The period information, together with the overflow indication generated from the overflow detector 120, enables processor 117 to determine whether the incoming, received signal carried a call progress tone, and if so, to identify such call progress tone.

Figure 2:
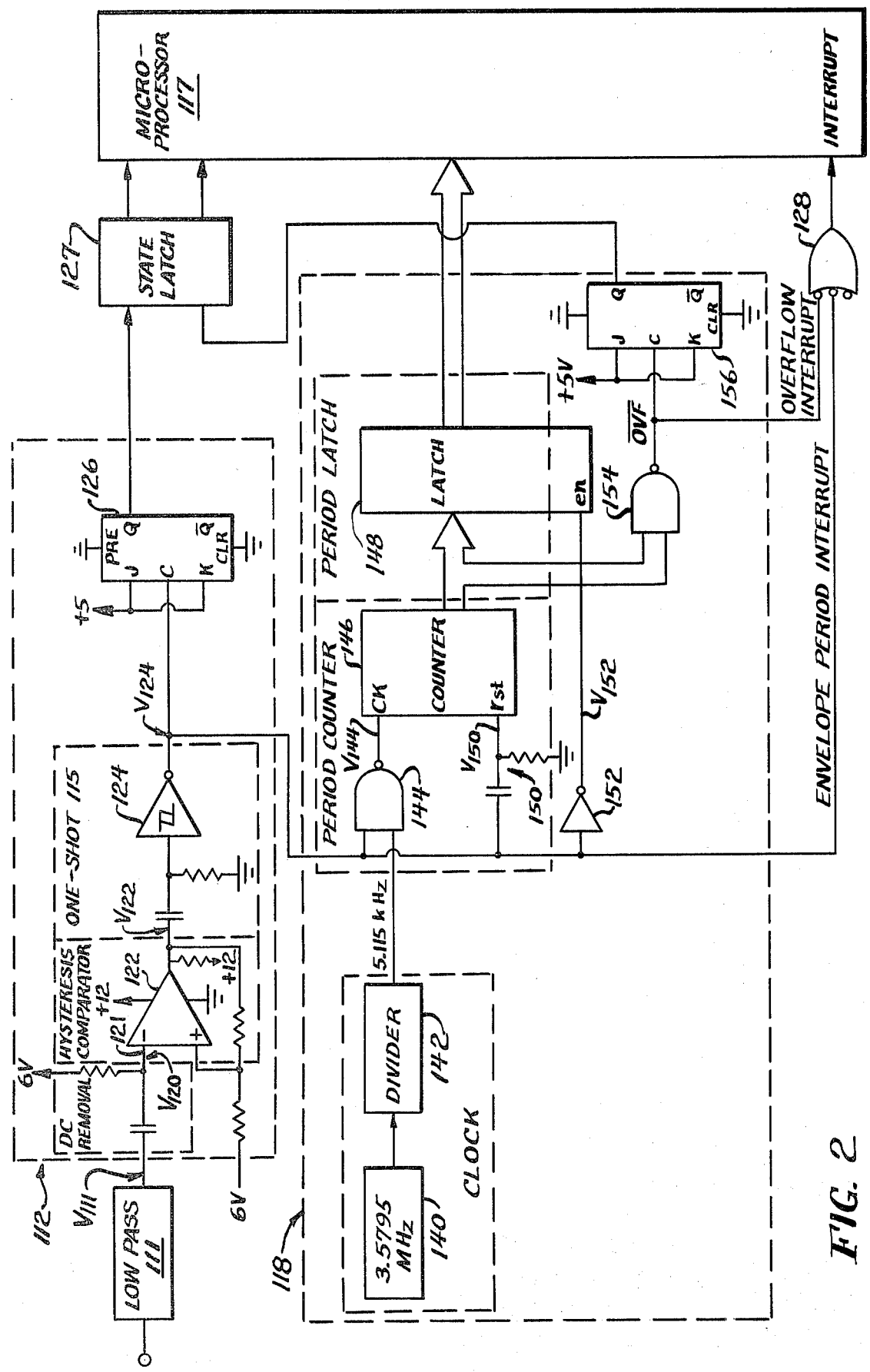
FIG. 2 is a schematic diagram showing an illustrative pearl period detector and pearl period counter.

FIG. 2 illustrates the period detector 112 and period counter 118 of FIG. 1. The output of low pass filter 111 is AC coupled to the inverting input 121 of an amplifier 122, illustratively a type 339 comparator. Amplifier 122 forms a hysteresis comparator whose output V122 is applied to an inverter 124 with a hysteresis input which operates as one-shot 115. For example, a type 40106 CMOS Schmitt Trigger Inverter can be used. The output of one-shot 115 clocks a "state" JK flip-flop 126 (such as a CMOS type 4027) whose output is applied to microprocess 117, illustratively a Mostek 3872 or a Fairchild F8. Illustratively, a "state" latch 127 (such as a type 74LS373 with eight inputs and eight outputs) has one input connected to the Q output of flip-flop 126. The corresponding output is connected to one of the ports of microprocessor 117. Programmed microprocessor 117 enables the latch output after it receives an interrupt. The output of one-shot 115 is also applied to one of many inputs to an inverting OR gate 128 whose output is connected to an interrupt input of microprocessor 117. The state flip flop allows the microprocessor to determine which process caused an interupt by examining all state flip flops when an interupt occurs to see which one changed.

Figure 3:
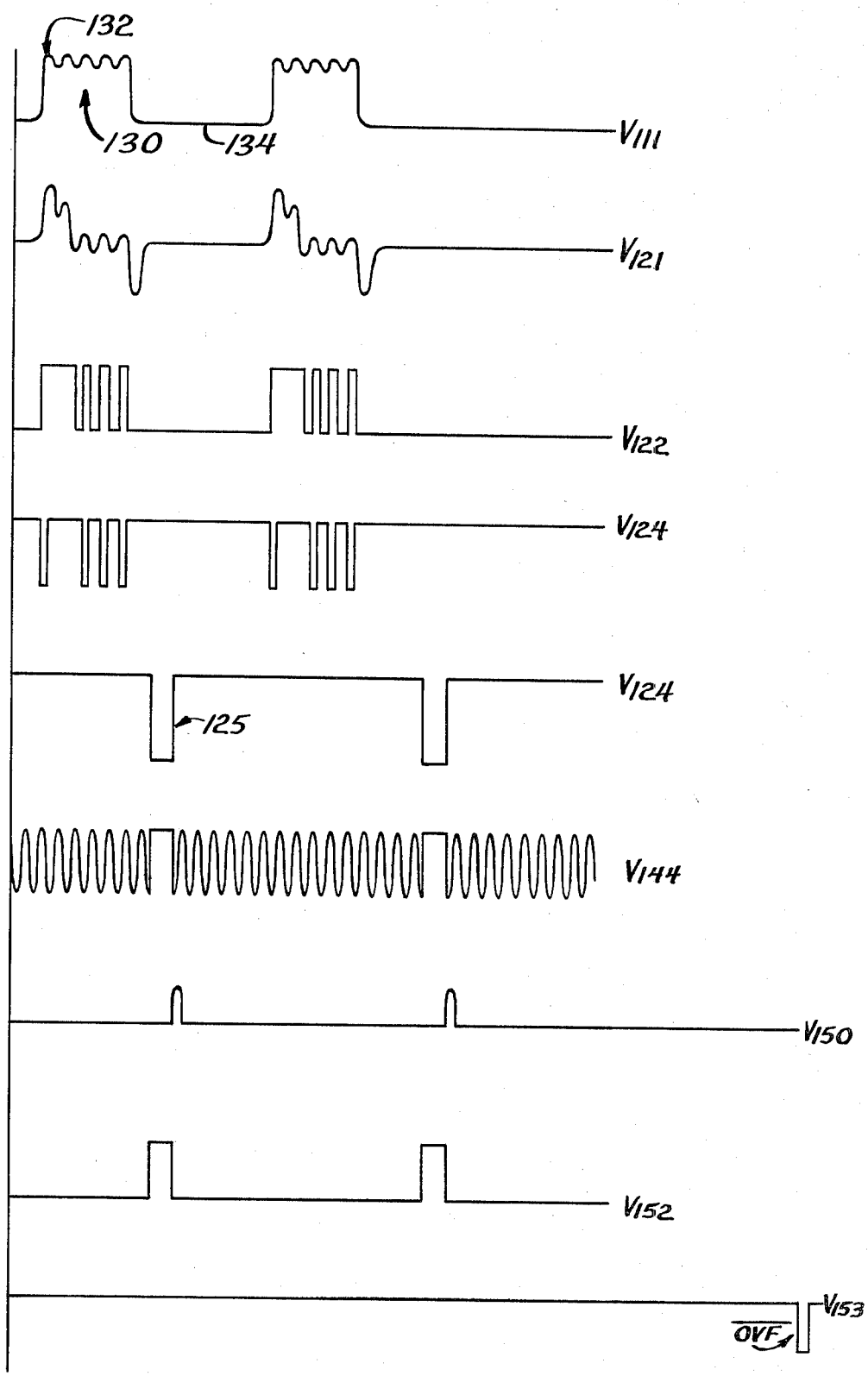
FIG. 3 is a set of waveform voltages generated in the FIG. 2 circuit, and is useful in understanding the present invention.

FIG. 3 illustrates various waveforms developed in the period detector 112. The waveform (voltage) V111 illustrates the input to detector 112, i.e., the output of low pass filter 111. The AC coupled input to the inverting input 121 of amplifier 122 is shown as V121. The output V122 of that amplifier also is shown and, as can be seen, comprises a digitized envelope signal. One-shot 115, which interrupts microprocessor 117 via gate 128 outputs negative pulses 125 which occur each time the AC coupled envelope crosses zero.

For systems considerations, microprocessor 117 will consider that all of the inputs are constant unless the microprocessor receives an interrupt signal to indicate otherwise. Accordingly, the interrupt input connected to gate 128 causes microprocessor 117 to scan its "state" inputs. Pulses 125 clock flip-flop 126 whose Q output is connected to the state input of microprocessor 117. As will be described, other state inputs are connected to microprocessor 117. Consequently, upon receipt of an interrupt pulse, microprocessor 117 determines that the Q level of flip-flop 126 changed state and therefore concludes that an envelope cycle has occurred and been detected.

Waveform V111 consists illustratively of broad pulses 130 having envelope cycles 132 thereon. Pulses 130 are followed by periods 134 with no detectable amplitude modulation, i.e., with very long periods. Illustratively, each of pulses 130 and terms 134 endure for about 500 miliseconds, as would occur for a "busy" tone. The frequency of cycles 132 is in the range of 20 to 200 Hertz. The period during the term 134 corresponds to approximately 0.1 to 1.0 Hertz. The negative-going pulses at waveform V124 each last for between one and ten microseconds.

Referring again to FIG. 2, envelope period counter 118 is also shown. It includes a 3.5795 megahertz oscillator 140 whose output is applied to a divider 142 to result in a 5.115 kilohertz clock signal. (This can be achieved using a 3.5795 MHz crystal oscillator stepped through type 4027B serially connected JR flip-flop (to divide by four) and a CD40103 set to divide by 175). Clock signals are applied to one input of a NAND gate 144 whose other input is connected to the output of one-shot 115. The output of gate 144 clocks a counter 146, such as CD4520, whose eight-line output is applied to a latch 148 (such as a 74LS373) connected to microprocessor 117. Pulses 125 output by one-shot 115 reset counter 146 by means of an RC circuit 150 connected to the reset input of counter 146. Similarly, pulses 125 enable latch 148 by means of an inverter 152 connected to the enable input of the latch. This circuitry provides a measure of the period of envelope cycles 132 (FIG. 3).

Counter 118 also includes circuitry for measuring the duration of terms 134. Thus, the output of counter 146 is applied also to a NAND gate 154 whose output OVF both interrupts microprocessor 114 via gate 128 and clocks an overflow state flip-flop 156. Flip-flop 156 is a JK flip-flop with the J and K inputs tied together and the Q output coupled to an input of state latch 127, which is connected to microprocessor 117.

The operation of counter 118 will now be described with reference to FIGS. 2 and 3 which shows waveforms developed in counter 118. Clock pulses at 5.115 KHz pass through NAND gate 144 to clock counter 146. The bottom five waveforms of FIG. 3 are shown in an expanded scale. It should be noted that the clock pulse frequency is much greater than the time between pulses 125. Counter 146 therefore counts clock pulses between pulses 125 and provides this information to latch 148. Each pulse 125 stops the period count through gate 144, and loads this count into latch 148. The trailing edge of pulse 125 causes one shot 150 to reset counter 146 for the next period measurement. Latch 148 saves the count between pulses 125 and holds it for microprocessor 117.

If counter 146 reaches a full count of 255 counts, then the overflow signal OVF is emitted by gate 154. It signifies that a measured period of time has elapsed without an envelope cycle 132 and hence its period having been detected. In other words, each overflow pulse OVF indicates that the telephone line has been silent or that no envelope cycle has been detected for 255 counts. This time is approximately 50 milliseconds.

Microprocessor 117 keeps track of the number of interrupts (both overflow counts and envelope cycle detection 125) and of the envelope periods. From this, it can determine what is happening on the telephone line. Microprocessor 117 has software to correlate the input measurements to known signal data thereby to determine precisely what call progress tones are on the line.

Figure 4:
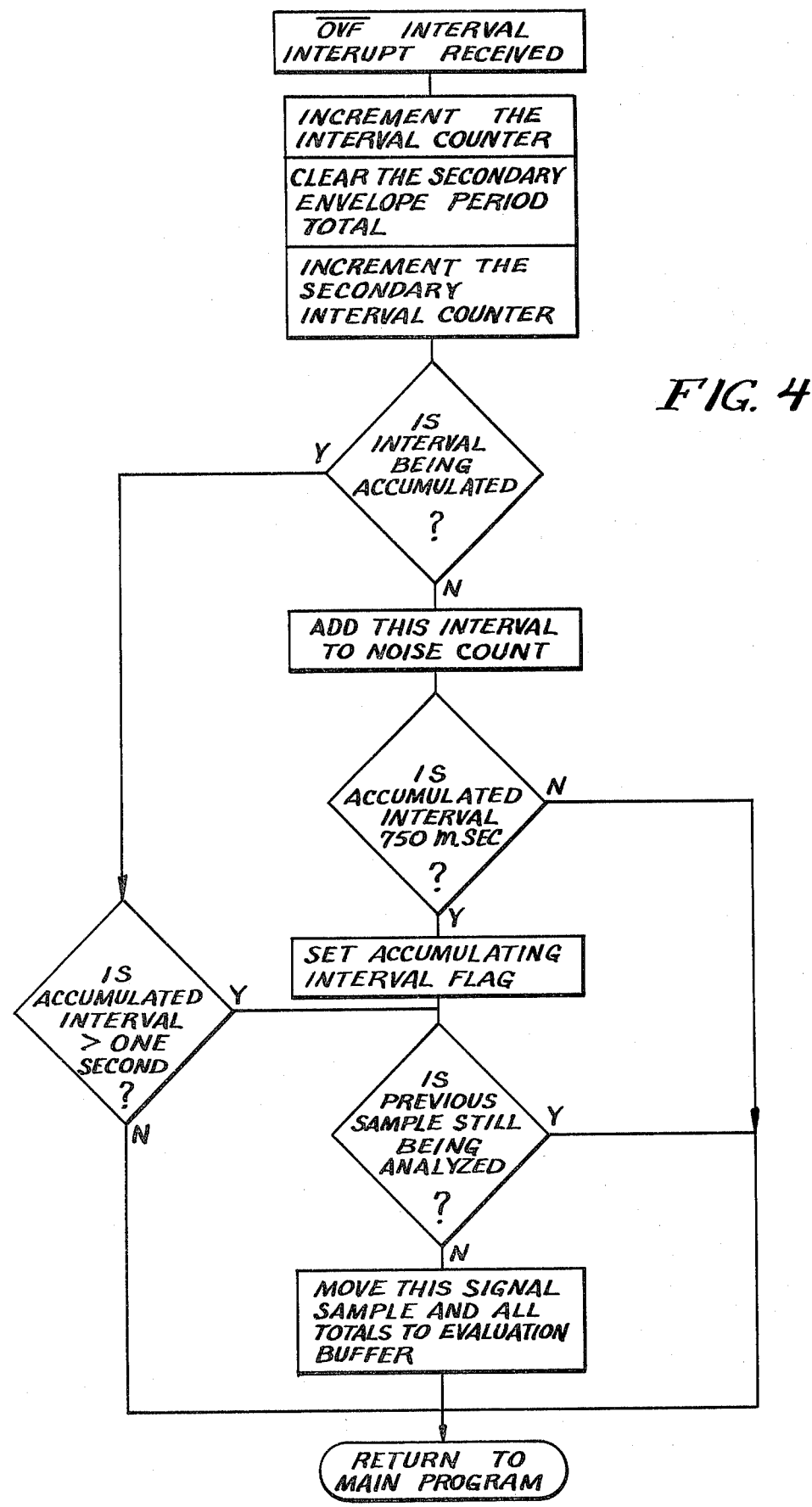
FIG. 4 is a flow chart showing how the microprocessor of the illustrative embodiment operates when an overflow interrupt occurs.

FIG. 4 is a flow chart showing the operation of programmed microprocessor 114 in the illustrated embodiment when a period overflow interrupt OVF (also called an interval interrupt) is received.

Figure 5:
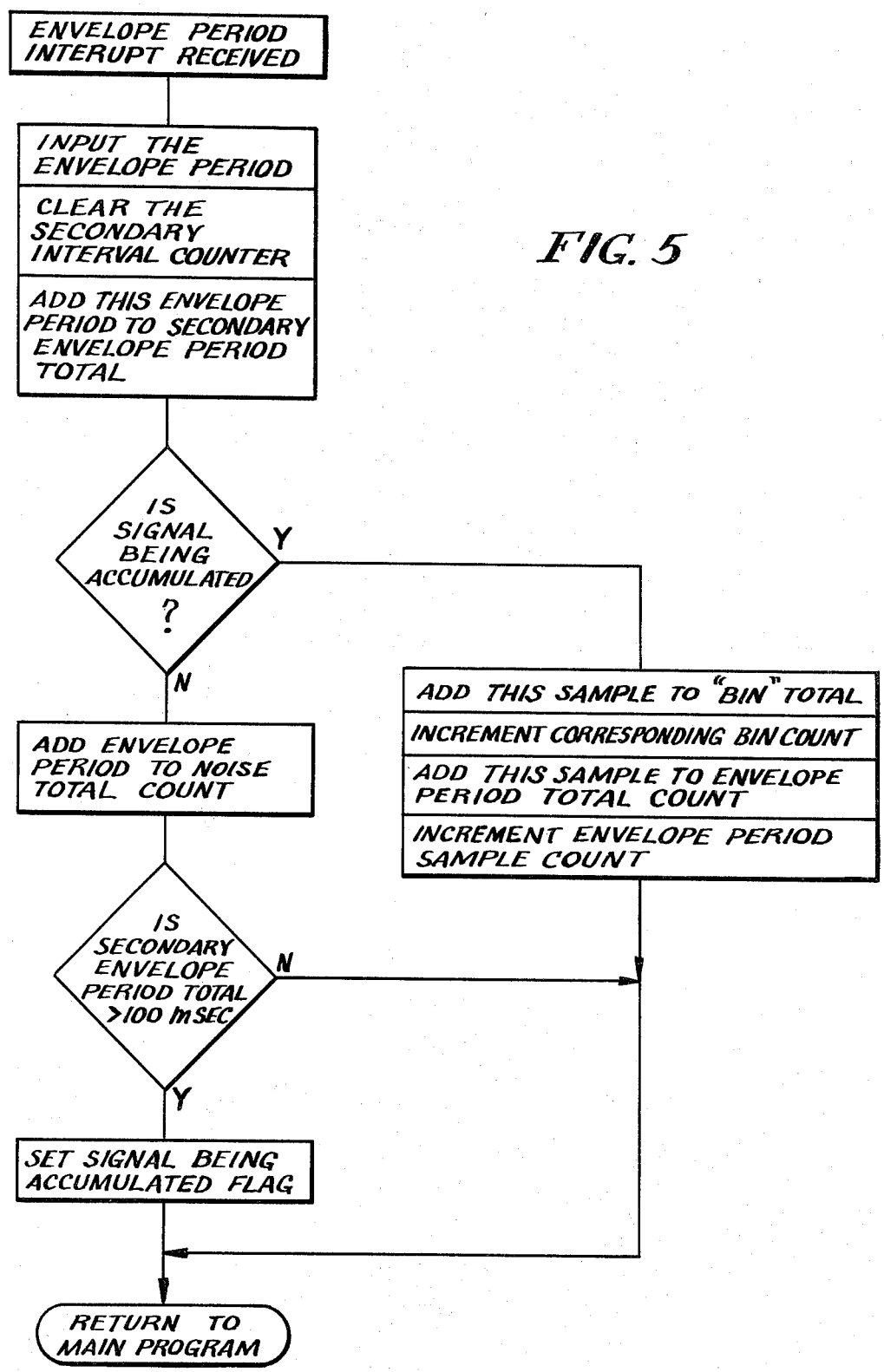
FIG. 5 is a flow chart showing how the microprocessor of the illustrated embodiment operates when a pearl cycle (period) interrupt occurs.

FIG. 5 is a flow chart showing how programmed microprocessor 117 operates in the illustrated embodiment when an overflow cycle (period) interrupt is received.

Figure 6:
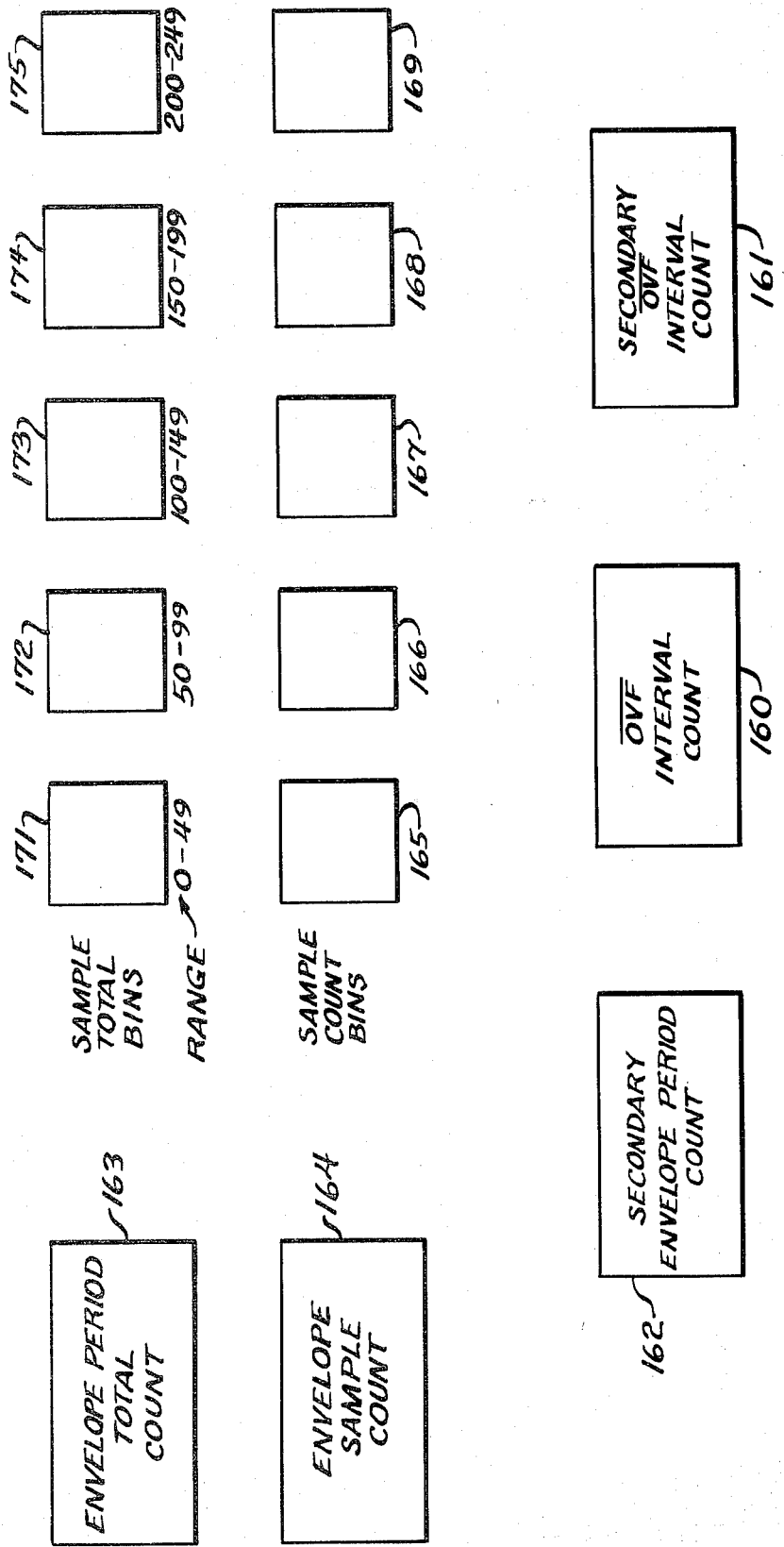
FIG. 6 is a sketch of various counts and bins used in FIGS. 4 and 5.

FIG. 6 is a sketch which illustrates graphically a conceptual model of the structure of the system described by FIGS. 4 and 5.

When identification of a call progress tone is requested, illustratively by command of a host processor for the overall system communicating with the microprocessor 114, the system operates as follows. The system, when first enabled, assumes that it is receiving overflow interrupts OVF. The number of OVF interrupts is accumulated as an OVF interval count 160 and in a secondary OVF interval counter 161 to provide a measure of the silent time. Each time the accumulated OVF interrupts are equivalent to one second, interrupt routing in microprocessor 117 passes the total and contents of other registers to be described infra to a buffer area for identification by a Background Routine of the call progress.

If an envelope cycle is detected by detector 112 to cause an interrupt pulse 125, the envelope period is accumulated as a secondary envelope period count 164 in the microprocessor to determine the total time in which sound is present. If such total becomes larger than 100 milliseconds, a flag is set in the microprocessor indicating that the program now will totalize envelope period interrupts. In other words, whenever a minimum of 100 milliseconds of sound is detected, microprocessor 114 allows envelope period information to be retained as a valid sample from which it can make an identification. It will be understood that this arrangement operates as a noise filter, for the secondary envelope period counter 162 is reset each time an OVF interrupt is received. Microprocessor 117 assumes that if less than 100 milliseconds of sound occurs before a silent period, then the sound must have been noise. It therefore discards the "sound" information.

As shown in FIG. 6, programmed microprocessor 117 also employs an envelope period total count 163 to totalize the "sound" time, and an envelope total sample count 164 to totalize the number of detected envelope cycles. Also shown is an illustrative set of sample count bins 165, 166, 167, 168 and 169. The ranges 170 for each bin is associated with the bins. A set of sample total bins 171, 172, 173, 174 and 175 is shown, each having respective ranges corresponding to those for the sample count bins. Illustratively, a sample count bin 165 corresponds to a range of zero to "49" clock counts. Sample count bin 166 illustratively corresponds to "50" to "99" counts; a bin 167 corresponds to "100" to "149" counts, etc. The same ranges correspond to the sample total bins 171 to 175. Preferred ranges are contained in Appendix 2 (attached to the file of this application at the U.S. Patent and Trademark Office), which uses eight bins.

All counts initially start at zero. Each time an envelope cycle is detected and its period ascertained by counter 118, the period is compared to the various ranges 170 to determine into which range the period falls. The period is then added to the proper sample total bin 171, 172, 173, 174 or 175 for that range. Also, the corresponding sample count bin 165, 166, 167 168 or 169 for that range is incremented by one count. This process continues, and the sample total bins maintain respective cumulative totals of the envelope cycle 132 periods falling into the respective bins, while the sample count bins continuing incrementing depending on the envelope cycle 132 periods which are detected.

For example, assume that the system becomes enabled. All of the bins and counts are zeroed. Assume that enough cycles are detected so that the secondary count 162 exceeds 100 milliseconds, so that envelope cycle 132 periods will henceforth be accumulated. Next, an envelope cycle is detected by detector 116 and its period is determined by counter 118 to be "45" clock counts. The total sample count register 164 is incremented from zero to one. Microprocessor 117 determines that this envelope cycle 132 period of "45" clock counts falls within the range of zero to "49." It therefore increments the sample count bin 165 from zero to one. Also, it enters "45" in sample total bin 171. Further, it enters "45" in count 163 which accummulates the time that all of the sample total bins. Thus, the sample count 164 shows "1," count 163 shows 45," sample count bin 165 reads "1," sample count bins 166 to 169 read "0," sample total bin 171 reads "45," and sample total bins 172 to 175 read "0."

Assume now that a second cycle is detected and is measured at "75" clock counts. The sample count 164 is then incremented from one to two because two samples have been detected. Microprocessor 117 determines that "75" is in the range of "50" to "99" and therefore determines that the sample bins 166 and 172 are appropriate. It therefore increments bin 166 to one and enters "75" units into bin 172. Further, it adds "75" to the "45" in count 163 which now reads "120." This means that there has been "120" clock counts of cycles uninterrupted by an overflow signal $\overline{OVF}$.

Assume now that a third cycle is detected of "63" clock counts. The envelope cycle sample count 164 is now incremented to "3" (meaning that three envelope cycles have been detected). Microprocessor 117 determines that the number "63" is in the range of "50" to "99" and that bins 166 and 172 are appropriate. It therefore increments bin 166 from one to two. It adds the "63" clock counts to bin 172. Such bin, it will be recalled, had "75" stored therein from the second sample. Consequently, sample total bin 172 now will read "138" clock counts. Further, the period total count 163 which stores the total "sound" time, will add "63" for the third sample to the "120" counts for the first and second samples to result in an accummulated period ("sound") time of "183" counts.

This procedure continues in microprocessor 117 until an accumulated overflow interrupt $\overline{OVF}$ greater than 50 milliseconds occurs. In the preferred embodiment, an overflow signal $\overline{OVF}$ is generated after about 50 milliseconds. Thus, the first $\overline{OVF}$ signal after a series of envelope cycles is sufficient. At that time, all register and bin totals are ready to be inputted to a buffer area in the microprocessor for further analysis by the Background Routine.

When the Background Routine is enabled, it first determines whether the period total count 163 has enough clock counts in it so tht the accummulated envelope period time exceeds 250 milliseconds. This simply assures a broad enough sample.

Figure 7A:
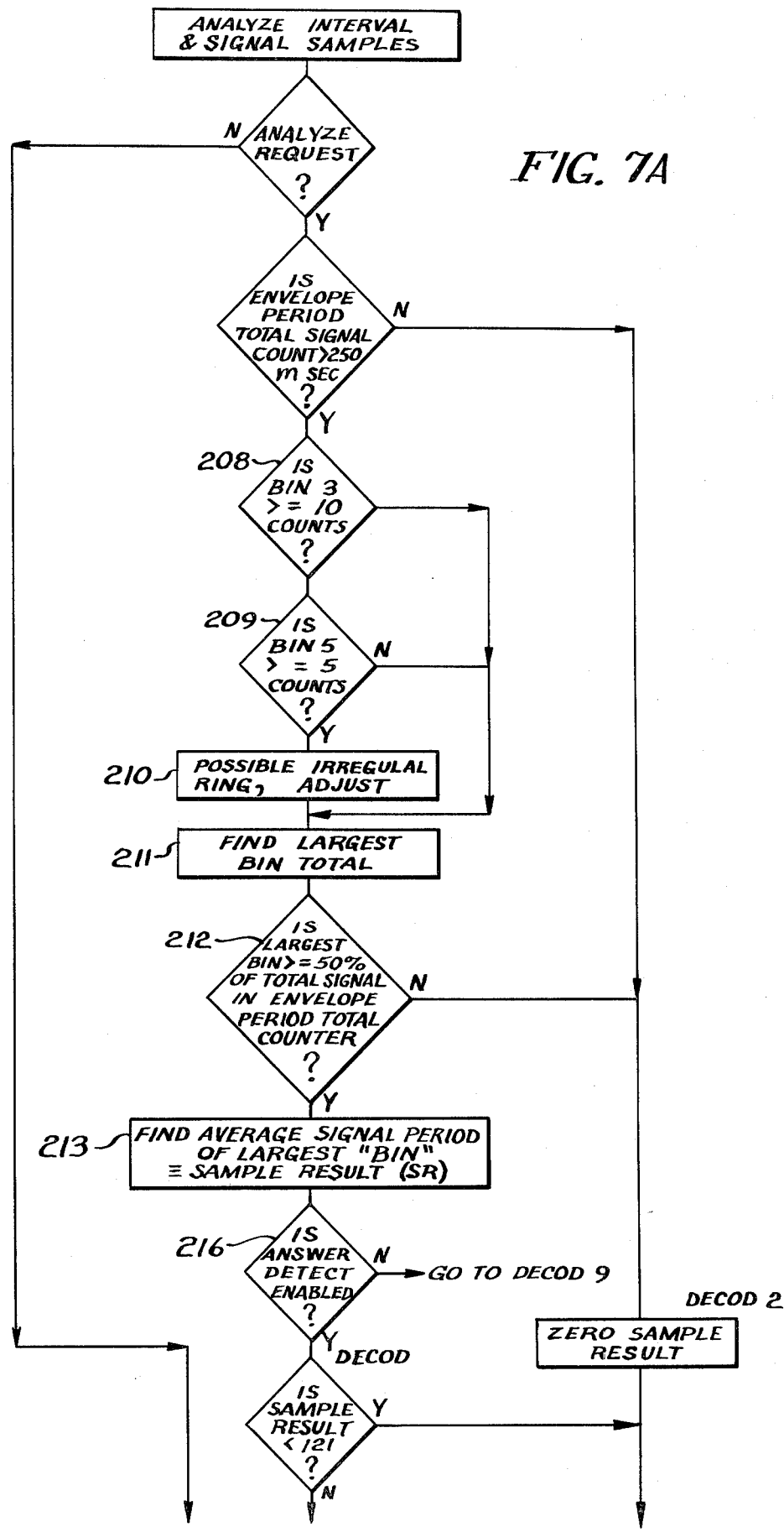
FIG. 7A, 7B and 7C together form a flow chart showing the operation of an illustrative "Background Routine" used by the microprocessor of the illustrative embodiment to analyze input data respecting the progress of a telephone call to identify the call progress.
Figure 7B:
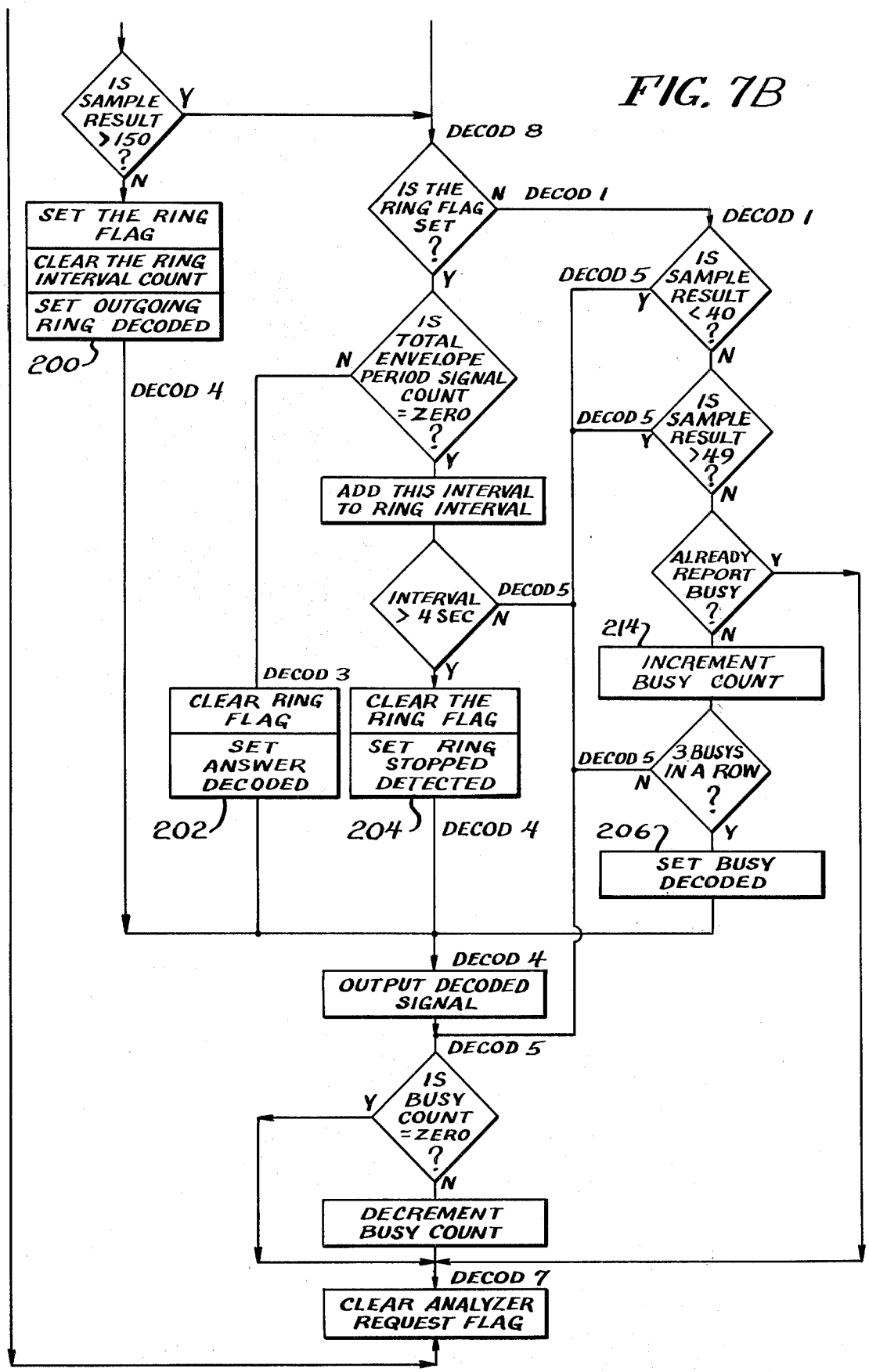
Figure 7C:
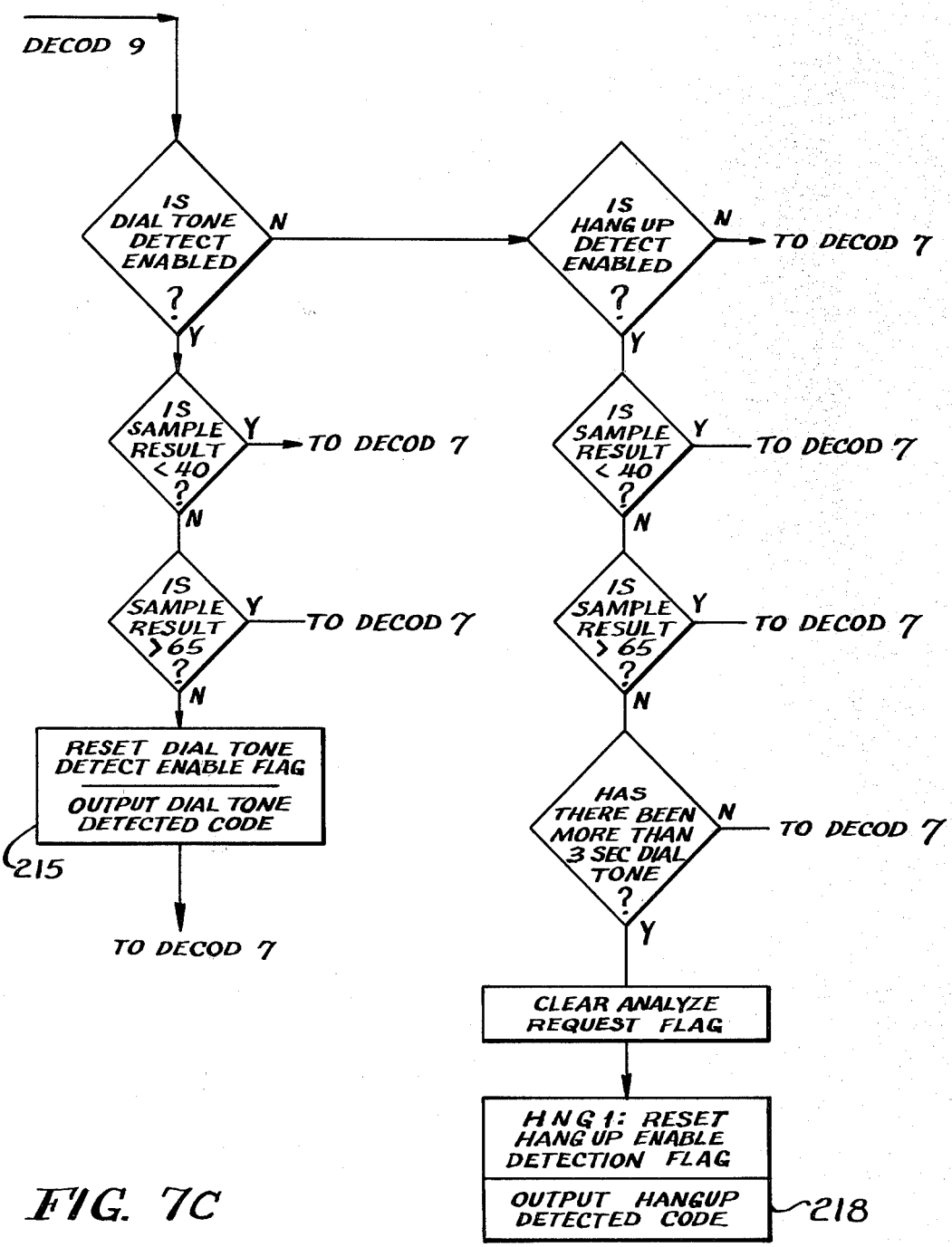

FIGS. 7A, 7B and 7C together form a flow chart to show the operation of programmed microprocessor 117 in the Background Routine. It will be observed that FIG. 7B includes steps identifying the call progress tones. For example, step 200 is an identification by the system that a "RINGING" call progress tone has been detected. Step 202 represents an identification by the system that the called party has answered the telephone call. Step 204 represents an identification by the system that the RINGING tone has stopped. Step 206 represents an identification by the system that a "BUSY" tone has been identified.

Those skilled in the art will readily comprehend the flow charts of FIG. 7. However, the following overview should be of assistance to others. Referring to FIG. 7A, decision diamonds 208 and 209 test for a characteristic pattern resulting from the envelope periods of a RINGING tone. Usually, such tone results in the third bin (i.e., bin 167 of FIG. 6) containing ten or more counts and the fifth bin (i.e., bin 169 of FIG. 6) containing 5 or more counts. If so, an adjustment is made in block 210 which adds one-half the bin 167 count to the bin 169 count, and adds bin 173 total to the bin 175 total.

Next, block 211 and decision diamond 212 determine whether the envelope periods of the sample show that the envelope cycles were substantially regular. This is assumed to be true if the largest bin 171, 172, 173, 174 or 175 contained one-half or more than the total count of 163. If so, the period representative of regular envelope cycles is developed at block 213. Illustratively, the average period of such largest bin is used. This representative period is defined as the Sample Result ("SR").

In FIG. 7B, it will be seen that a regular pearl period of between "121" and "150" will be identified at block 200 as a RINGING call progress tone. A regular pearl period of between "40" and "49" will be identified at block 206 as a BUSY call progress tone after three detections of this tone are counted by block 214.

After RINGING has been detected, a sample of less than 250 milliseconds will be identified as an ANSWER. A regular envelope period of outside the range of "121" to 150" counts will also result in identification of ANSWER. If the envelope period total count is zero, it is assumed to be an interval interrupt and an accumulation of more than four seconds of interval is identified as RING STOPPED.

FIG. 7C illustrates a DIAL TONE detection 215 as a regular envelope period of between "40" and "65" counts. This identification can be made only prior to enablement of ANSWER detection circuitry (see decision diamond 216 of FIG. 7B).

A HANGUP identification 218 is shown also in FIG. 7C. This occurs when ANSWER detect and DIAL TONE detect are disabled, and upon receipt of envelope periods of between "40" and "65" counts.

Appendix 2 to the file of this application constitutes an assembly language listing of the flow charts illustrated in FIGS. 4, 5 and 7. In Appendix 2, "pearl" is used instead of "envelope."

Figure 8:
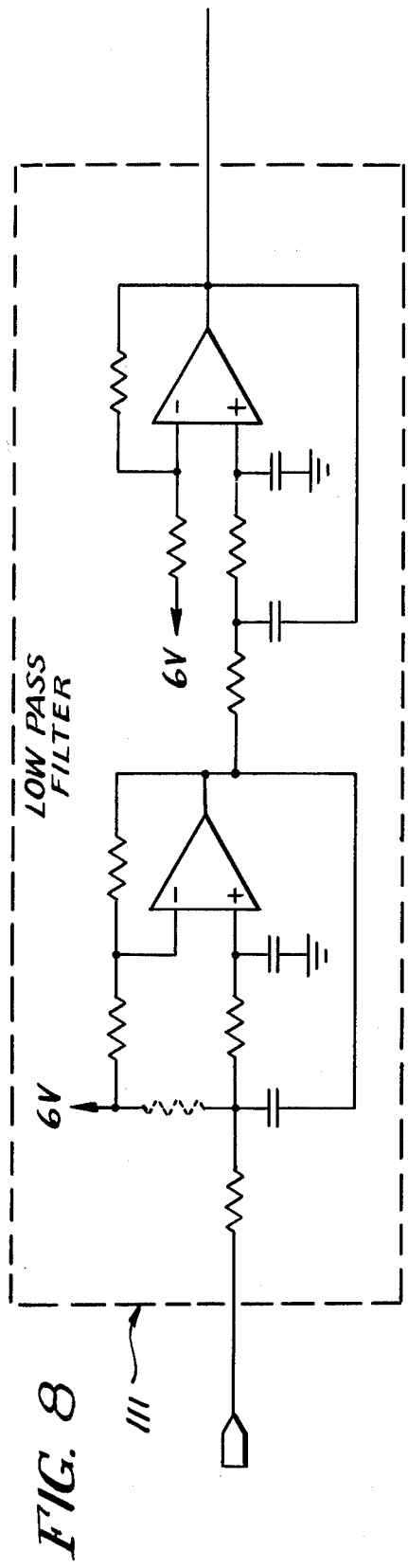
FIG. 8 shows a low pass filter used in the illustrative embodiment.

Illustratively, low pass filter 112 may comprise two serially connected dual pole Butterworth filters. FIG. 8 illustrates a low pass filter of the present embodiment.

Figure 9:
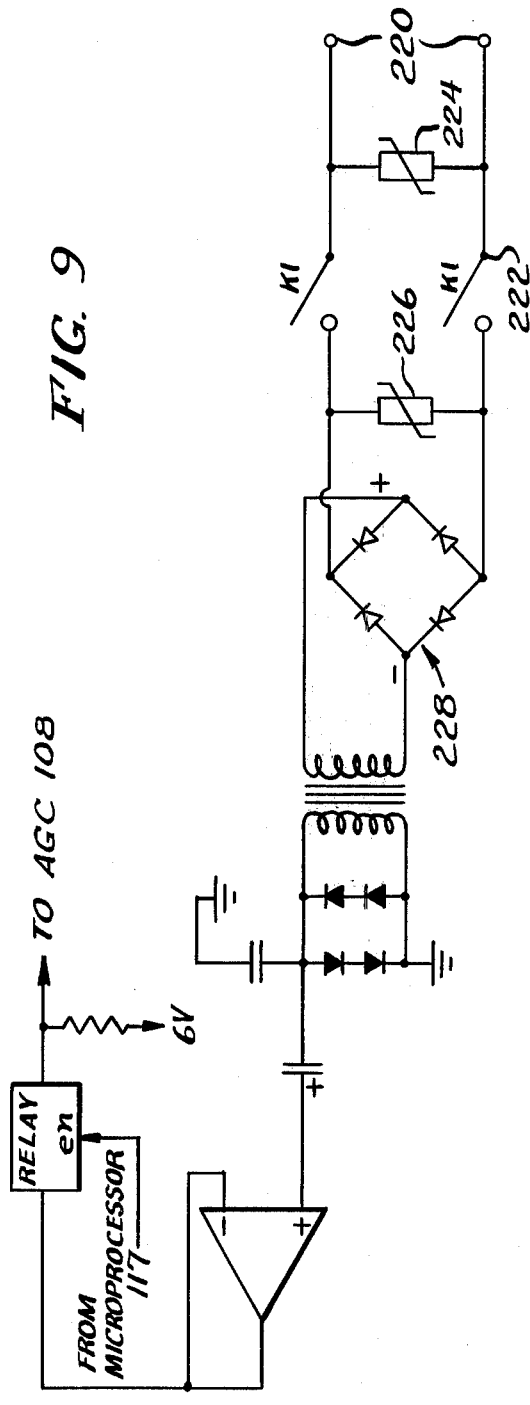
FIG. 9 shows an interface to connect a telephone line to the automatic gain control circuit of FIG. 10.
Figure 10:
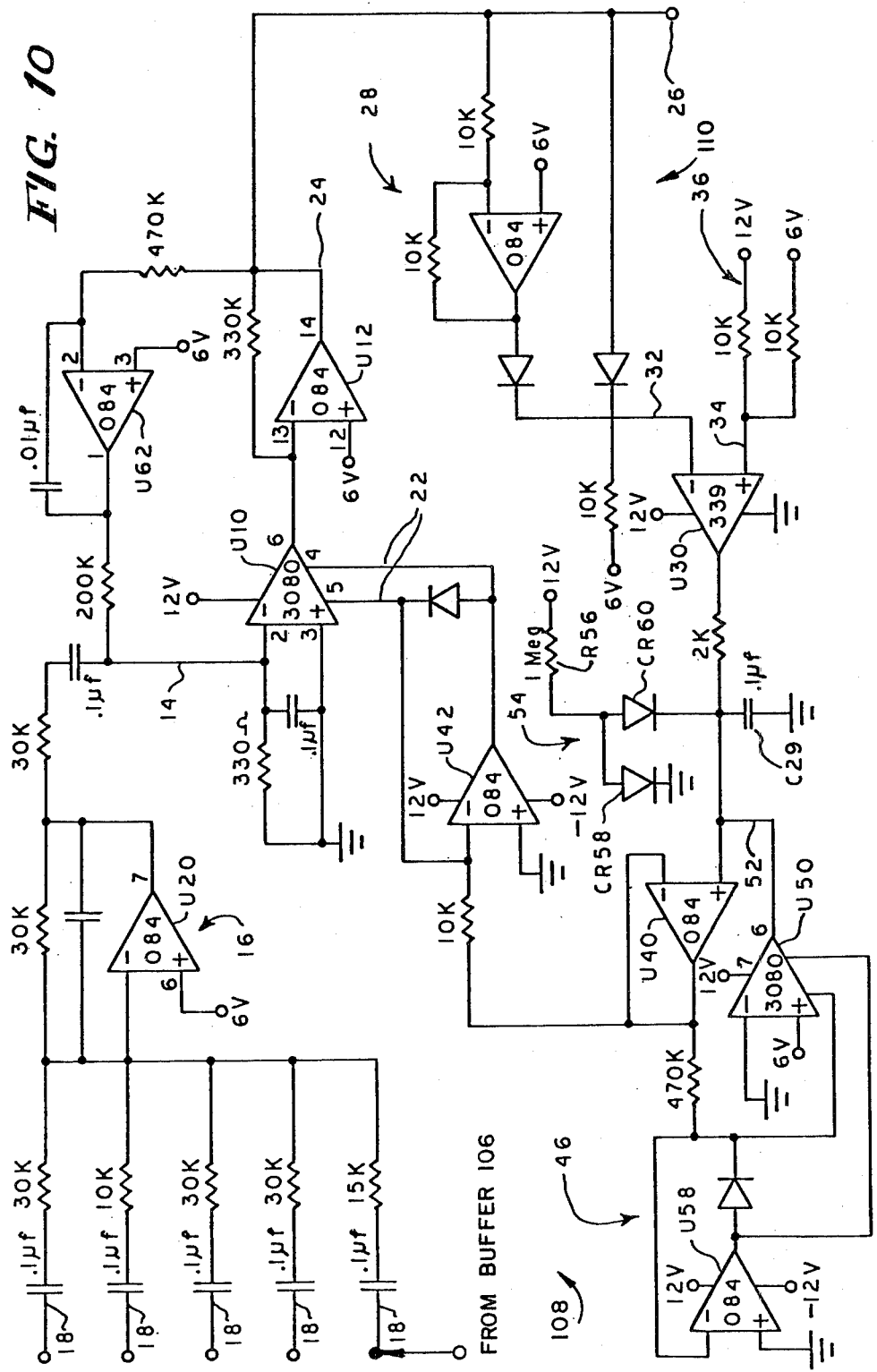
FIG. 10 shows an automatic gain control circuit and full wave rectifier of FIG. 1 used in the illustrative embodiment.

FIG. 9 illustrates an interface to connect the telephone line to the automatic gain control circuit 108. This interface includes isolation transformer 104 and line buffer 106. In FIG. 9, the telephone lines 202 are seized by a relay contact 222 under command of microprocessor 117. Voltage regulators 224 and 226 protect against surges. A diode bridge 228 couples the seized telephone line to isolation transformer 104. The secondary winding of transformer 104 is coupled to line buffer circuit 106 formed about amplifier 230 (illustratively a type 3403). Its output is connected by a relay 232 (illustratively a type 4066), enabled by microprocessor 117 to automatic gain control circuit 108 (see FIG. 10).

Figure 11:
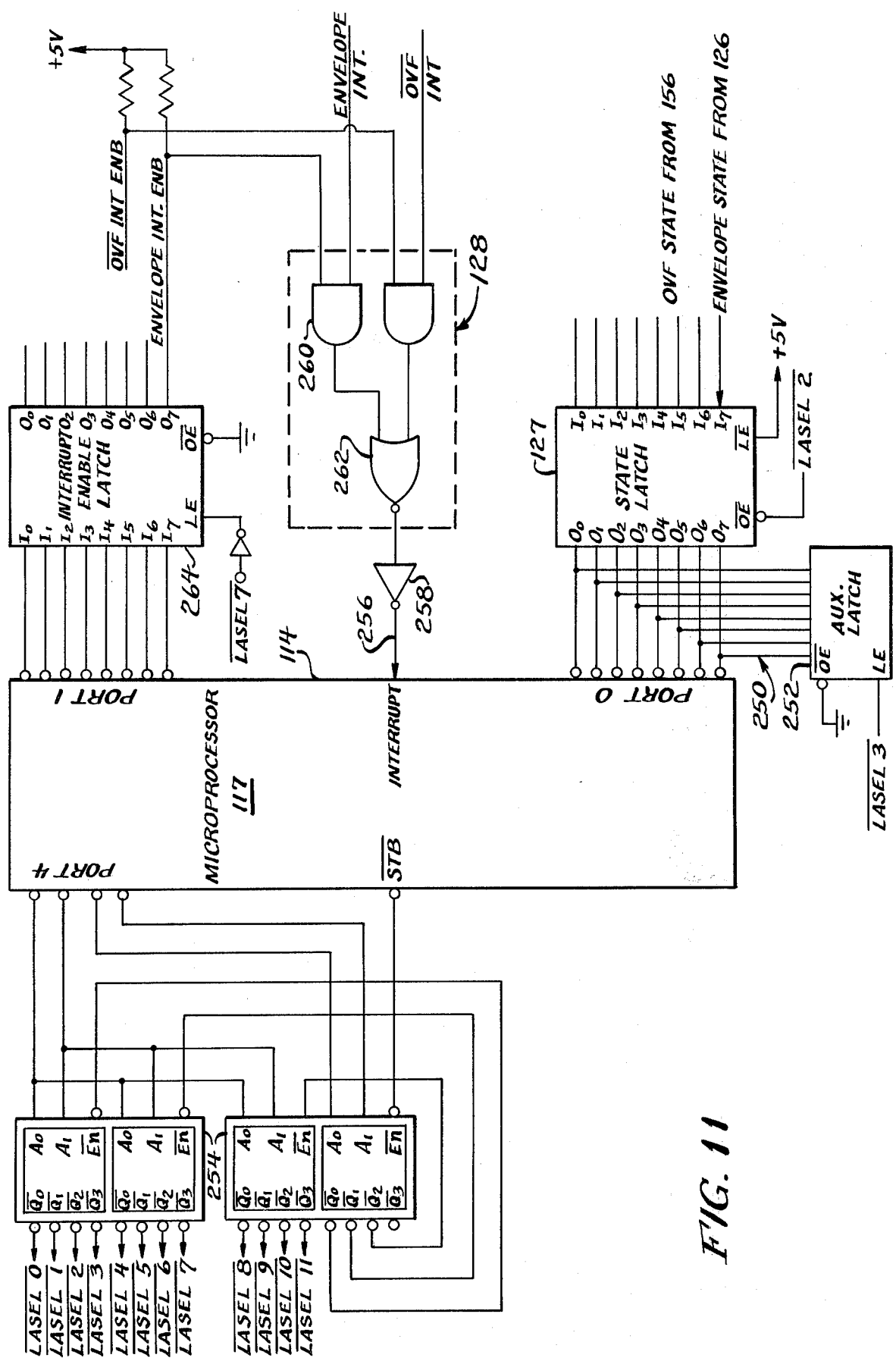
FIG. 11 illustrates the interface to the microprocessor.

FIG. 11 illustrates how various portions of the illustrated embodiment interface to microprocessor 117. In the preferred embodiment a Mostek 3872 microprocessor can be used although a Fairchild F8 could be employed. As can be seen, Port "0" of microprocessor 114 is connected to "state" latch 127 having inputs $I_0$, $I_1$, $I_2$, $I_3$, $I_4$, $I_5$, $I_6$ and $I_7$ and outputs $O_0$, $O_1$, $O_2$, $O_3$, $O_4$, $O_5$, $O_6$ and $O_7$. Latch 127 is continuously enabled, but the outputs are enabled only upon receiving signal $\overline{LASEL2}$. Such signal is developed from PORT 4 of microprocessor 117, which, when microprocessor 117 is programmed to examine the state inputs, identifies the particular latch to be read. It will be understood that other latches can be connected to microprocessor Port O, such as by connections 250, each latch being read by a respective "latch select" signal such as $\overline{LASEL2}$. Illustratively, an auxiliary latch 252 is connected to Port O by connections 250. Latch 252 is enabled by signal $\overline{LASEL3}$.

The Port 4 latch selection is applied to a decoder 254 (illustratively a pair of CD4556's) connected to Port 4. A strobe output STB of microprocessor 114 enables the decoder 254 to decode the identification from microprocessor 114 of the latch(es) to be read.

Also shown in FIG. 11 is the interrupt input 256 to microprocessor 117. It receives external interrupts via an inverter 258 connected to gate 128 which comprises an arrangement of parallel AND gates 260 connected to a NOR gate 262. Each interrupt signal to be applied to microprocessor 117 has a respective AND gate 260. Gates 260 are shown for the envelope cycle detection interrupt and the overflow interrupt OVF. Each AND gate 260 is separately enabled by means of an interrupt enable latch 264 connected to Port 1 and itself. enabled by a latch enable signal $\overline{LASEL7}$. Latch 264 is enabled whenever call progress is to be determined. This arrangement provides improved flexibility and efficiency for a microprocessor system, allowing it to select from many possible inputs by using a port to identify the interrupt to be enabled.

The call progress tone detection circuit described herein requires only four to five sixteen pin chips and a few discrete components in the preferred embodiment. The cost is fairly low, and the circuit uses little space on a printed circuit board. Yet, despite these advantage of low cost and minimal space reqirement, the invented circuit is capable of accurately identifying call progress tones used in any of the known telephone systems in the United States. The circuit is substantially immune from noise and therefore operates quite accurately.

It is to be understood that the present invention, which is defined by the appended claims, has been described with reference to a particular, illustrative embodiment. Those who are skilled in the art will appreciate that many changes can be made to the embodiment described in this specification and illustrated in the accompanying drawings, fully within the scope of the present invention. For example, rectifier 110 and filter 112 operate as an envelope detector, and other envelope detectors may be substituted within the scope of the invention. Other forms of protection against noise may be used either within or outside of the microprocessor. The period counter 118 relieves microprocessor 117 of processing which could be done in the microprocessor if so desired. On the other hand, the invention could be embodied in a more complex circuit with less or no software, as desired by specific needs, However, the use of a microprocessor has been found to be advantageous. Other modifications within the scope of this invention can be made.

We claim:

1. A call progress tone detection circuit for determining whether an incoming telephone signal is a call progress tone and for identifying such call progress tone, comprising:
    envelope detector means for receiving a signal and for developing an envelope signal representative of the envelope of the received signal; and
    means for (a) determining the periods of envelope cycles in said envelope signal, (b) comparing the periods of said envelope cycles to the corresponding periods of envelope cycles in envelope signals for known call progress tones, and (c) identifying a call progress tone if said envelope cycle periods match the envelope cycle period of a known call progress tone.

2. The apparatus of claim 1 wherein said envelope detector means comprises a rectifier coupled to receive the incoming signal and a low pass filter coupled to the output of said rectifier.

3. The apparatus of claim 1 wherein said second-named means includes an envelope period counter means connected to said envelope detector means for determining the period of envelope cycles in said envelope signal, and processing means connected to said counter means for identifying call progress tones based on detected envelope periods.

4. The apparatus according to claim 1 wherein said second-named means includes:
    envelope period detector means coupled to said envelope detector means for indicating envelope cycles in said envelope signal;
    envelope cycle period counting means coupled to said period detector means for indicating the periods of said envelope cycles; and
    processing means coupled to said counting means for classifying said incoming telephone signals based on comparing said envelope cycle periods of said envelope signal with corresponding characteristics of known call progress tones and for identifying the known call progress tone whose envelope cycle period substantially matches the envelope cycle periods indicated by said envelope cycle period counting means.

5. The apparatus according to claim 4 wherein said envelope cycle period counting means comprises:

logic means responsive to indications of envelope cycles by said envelope period detector means; and counting means coupled by said logic means to a pulse generator means for indicating a number of regular time intervals representative of the period of detected envelope cycles.

6. The apparatus according to claim 4 or 5 wherein said period detector means includes means for detecting zero crossings and means for AC coupling said envelope signal to said zero crossing detecting means.

7. The apparatus according to claim 1 wherein said second-named means further includes a noise detector means for inhibiting said comparing means unless said envelope signal meets a preselected parameter.

8. A call progress detector circuit for identifying the progress of telephone calls, including detecting and identifying call progress tones and identifying an apparent answer to the telephone call, comprising:

first means for receiving a telephone signal and for detecting envelope cycles therein; and identification means responsive to said first means for identifying the progress of a telephone call based on relationships of information about said detected envelope cycles and known telephone call progress tones, said information including the period of said envelope cycles.

9. The circuit according to claim 8 further including means for providing indications of the times during which no envelope cycle is detected in said telephone signal; and wherein said identification means also employs said time indications in said identifying.

10. The circuit of claim 8 including:

means for determining an average period of said detected envelope cycles; and means for comparing said average period to known values to identify preselected call progress tones.

11. The circuit of claim 8 including:

means for selecting said envelope cycles which are substantially regular in period; and means coupled to said selecting means for identifying known call progress tones if the periods of said selected envelope cycles are within known, predetermined ranges.

12. The circuit of claim 11 wherein said selecting means includes:

bin means for arranging said detected envelope cycles into groups based on their envelope periods;

means coupled to said bin means for selecting the largest bin total;

means coupled to said selecting means fo determining whether said largest bin total meets a threshold related to the accummulated envelope periods of all of said detected envelope cycles; and means responsive to said threshold-determining means for selecting an envelope period representative of those largest bin envelope cycles determined to meet said threshold.

13. The circuit of claim 8 wherein said identification means identifies RINGING tones, and said identification means includes post-ringing decision means responsive to said RINGING identification and to said first means for determining whether the RINGING tone has been altered.

14. The circuit of claim 13 wherein said post-ringing decision means includes:

answer decision means for determining whether the periods of signals detected by said first means meet a predefined criterion.

15. The circuit of claim 14 further including a counter responsively coupled to said answer decision means for accummulating time signals and means responsive to said counter for indicating that said RINGING tone has stopped.

16. The circuit of claim 8 wherein said identification means identifies BUSY tones, said identification means including:

busy counter means for accummulating detections of BUSY tones; and busy indicator means responsive to a predetermined state of said busy counter means for identifying a BUSY tone.

17. The circuit of claim 8, 11 or 13 including sample finding means coupled to said first means for selecting a sample of envelope cycles which are not apparent noise including:

noise eliminating means for disqualifying detected envelope cycles which are apparent noise.

18. The circuit of claim 17 wherein said noise eliminating means includes:

means for indicating terms when no envelope period is detected in said received telephone signal;

means for accumulating the periods of said detected envelope cycles;

means coupled to said no-period indication means for altering the state of said accumulation means unless it reaches a selected accumulation prior to indication of a term of no envelope period.

19. A call progress detector circuit for identifying the progress of telephone calls comprising:

envelope cycle detection means for receiving a telephone signal and for detecting envelope cycles therein;

period indicating means for indicating the period of signals detected by said envelope cycle detection means;

sample finding means coupled to said envelope cycle detection means for selecting a sample of envelope cycles which are not apparent noise;

means for determining whether said sample contains envelope cycles whose periods are substantially regular;

means responsive to said regularity-determining means for selecting an envelope period representative of the period of envelope cycles whose periods have been determined to be regular;

RINGING decision means responsive to said representative envelope period for identifying a RINGING call progress tone by comparing said representative envelope period to characteristics of known RINGING call progress tones;

BUSY decision means responsive to said representative envelope cycle period for identifying BUSY call progress tones by comparison thereof to characteristics of known BUSY call progress tones;

RINGING STOPPED decision means responsively connected to said RINGING decision means and to said envelope cycle detection means for determining a change in the telephone signal subsequent to a RINGING identification.

20. A method for automatically and electronically identifying call progress of telephone calls in a telephone communication system comprising:

detecting the envelope of the incoming signals to develop an envelope signal representative thereof;

detecting a preselected parameter of envelope cycles in said representative envelope signal;

comparing the detected parameter of the representative envelope signal with parameters of known tone progress calls; and identifying a tone progress call if said detected parameter of the representative envelope signal substantially matches the corresponding parameter of a known tone progress call.

21. The method according to claim 20 wherein said envelope detecting step comprises rectifying the incoming signal and then substantially eliminating high frequency components of the rectified signal.

22. The method according to claim 20 wherein said detecting step includes determining the period of said envelope cycle.

23. The method according to claim 22 wherein said period determination includes inhibiting effects attributable to noise.

24. A method for automatically and electronically identifying the progress of telephone calls on a telephone communication system comprising:
isolating the spectrum portion which contains difference frequencies for known call progress tones;
detecting a characteristic of envelope cycles within the spectrum portion;
comparing the detected characteristic with characteristics of known call progress tones; and
identifying a call progress tone if said comparison step results in a substantial match.

25. The method according to claim 20 or 24 wherein said comparing step includes selected comparisons of the periods of envelope cycles in said isolated spectrum portion with periods of envelope cycles of known call progress tones.

26. A method for automatically and electronically identifying the progress of a telephone call on a telephone communication system comprising:
detecting envelope cycles in the telephone signal;
identifying the progress of the telephone call based on relationships of information about said detected envelope cycles and characteristics about known telephone call progress tones, said information including the period of said envelope cycles.

27. The method of claim 26 wherein said identification step includes determining an average envelope cycle period and comparing said average period to predetermined ranges of envelope cycle periods of known call progress tones.

28. The method of claim 26 including:
selecting envelope cycles which are substantially regular in period; and
identifying known call progress tones if the periods of said regular cycles are within known, predetermined ranges.

29. The method of claim 28 wherein said selecting step includes arranging said detected cycles into groups based on their periods;

selecting the group having the greatest accumulation of periods;
determining whether said largest bin accumulation meets a threshold relating to the accumulated periods of all of the detected cycles; and
selecting a period representative of those largest bin cycles determined to meet said threshold.

30. The method of claim 26 wherein said identification step includes identifying RINGING call progress tones, said method further including electronically and automatically determining whether a previously detected RINGING tone has been altered.

31. The method of claim 30 wherein said last named step includes determining whether an envelope cycle has been received whose period is not within the range for a known RINGING call progress tone or which is not regular in occurrence.

32. The method of claim 30 wherein said last named step includes, after detecting a RINGING call progress tone, then detecting the absence of a RINGING call progress tone for a preselected duration.

33. The method of claim 26 wherein said identification step includes identifying BUSY call progress tones and includes the steps of:
accumulating separate detections of BUSY tones; and
identifying a BUSY tone in response to a predetermined accumulation of BUSY tone detections.

34. The method of claim 26 including:
indicating terms after which no envelope cycle has been detected in the telephone signal;
accumulating the periods of detected envelope cycles;
altering said accumulation if a term of no envelope is indicated prior to said accumulation reaching a preselected state;
identifying call progress without regard to the period of signals detected prior to said accumulation reaching said predetermined state.

35. Apparatus for automatically identifying an answer to a telephone call comprising:
a detector circuit coupled to the telephone line on which the telephone call is placed for detecting envelope cycles in the signal on the telephone line;
identification means responsively coupled to said detector circuit for analyzing the envelope cycles and identifying an answer on the basis of receiving envelope cycles which do not match characteristics of envelope cycles of known call progress tones.

36. Apparatus according to claim 35 wherein said identification means includes:
means for detecting a RINGING tone; and
logic means coupled to said means for detecting a RINGING tone and for identifying an ANSWER if RINGING has been detected and a telephone signal is received which does not include envelope cycles which correspond to RINGING tones.

* * * * *